(12) United States Patent
Liao et al.

(10) Patent No.: US 12,084,273 B2
(45) Date of Patent: Sep. 10, 2024

(54) BARREL COVER WITH ENCODER GARBAGE BIN, AND BARREL COVER CONTROL METHOD

(71) Applicant: Jiangmen Jinlong High Technology Industrial Co., Ltd., Guangdong (CN)

(72) Inventors: Jinsheng Liao, Guangdong (CN); Weitang Lu, Guangdong (CN)

(73) Assignee: Jiangmen Jinlong High Technology Industrial Co., Ltd., Jiangmen (CN)

( * ) Notice: Subject to any disclaimer, the term of this patent is extended or adjusted under 35 U.S.C. 154(b) by 510 days.

(21) Appl. No.: 17/338,992

(22) Filed: Jun. 4, 2021

(65) Prior Publication Data
US 2022/0324642 A1  Oct. 13, 2022

(30) Foreign Application Priority Data

Apr. 13, 2021  (CN) .......................... 202120755749.2

(51) Int. Cl.
*B65F 1/16* (2006.01)
*G05B 19/042* (2006.01)

(52) U.S. Cl.
CPC .......... *B65F 1/1638* (2013.01); *G05B 19/042* (2013.01); *B65F 2210/168* (2013.01); *G05B 2219/2613* (2013.01)

(58) Field of Classification Search
CPC .......... G05B 19/042; G05B 2219/2613; B65F 2210/168; B65F 1/1638

(Continued)

(56) References Cited

U.S. PATENT DOCUMENTS

| 4,581,565 A | 4/1986 | Van Pelt et al. |
| 11,338,994 B2 * | 5/2022 | Wang .................... B65F 1/1638 |

(Continued)

FOREIGN PATENT DOCUMENTS

| CN | 201849883 U | 6/2011 |
| CN | 102361423 A | 2/2012 |

(Continued)

OTHER PUBLICATIONS https://web.archive.org/web/20200809182624/https://byjus.com/physics/uses-of-resistor/ (Year: 2020).*

(Continued)

*Primary Examiner* — Robert J Hicks
*Assistant Examiner* — Sanjidul Islam
(74) *Attorney, Agent, or Firm* — Chernoff, Vilhauer, McClung & Stenzel LLP

(57) ABSTRACT

Disclosed are a barrel cover with an encoder, a garbage bin, a barrel cover control method, a motor driver, and a non-transitory computer-readable storage medium. The barrel cover with the encoder includes a housing, a motor, a buffer, a driving shaft, a cover plate, and a drive circuit; the housing is provided with a cover opening, a first connecting base, and a second connecting base; the motor is connected to the housing and provided with an encoder; a first end of the buffer is rotatably connected to the first connecting base, and a rotary shaft of the motor is connected to the first end of the buffer; an end of the driving shaft is rotatably connected to the second connecting base, and the other end of the driving shaft is connected to a second end of the buffer.

7 Claims, 7 Drawing Sheets

(58) Field of Classification Search
USPC .......................................... 220/211; 361/755
See application file for complete search history.

(56) References Cited

U.S. PATENT DOCUMENTS

| | | | |
|---|---|---|---|
| 2003/0201268 | A1 | 10/2003 | Lin |
| 2009/0194532 | A1* | 8/2009 | Yang .................... B65F 1/1638 |
| | | | 220/211 |

FOREIGN PATENT DOCUMENTS

| | | |
|---|---|---|
| CN | 202575148 U | 12/2012 |
| CN | 202261119 U | 5/2015 |
| CN | 204517703 U | 7/2015 |
| CN | 204606765 U | 9/2015 |
| CN | 204606804 U | 9/2015 |
| CN | 204761334 U | 11/2015 |
| CN | 206088011 U | 4/2017 |
| CN | 206283437 U | 6/2017 |
| CN | 207827099 U | 9/2018 |
| CN | 208531356 U | 2/2019 |
| CN | 110112966 A | 8/2019 |
| CN | 209805709 U | 12/2019 |
| WO | 2022217780 A1 | 10/2022 |
| WO | 2023272843 A1 | 1/2023 |

OTHER PUBLICATIONS

China National Intellectual Property Administration; International Search Report and Written Opinion for PCT/CN2021/108518 dated Jan. 18, 2022; 10 pages inclusive of English translation.
China National Intellectual Property Administration; International Search Report and Written Opinion for PCT/CN2021/108519 dated Mar. 28, 2022; 12 pages inclusive of English translation.

* cited by examiner

BARREL COVER WITH ENCODER GARBAGE BIN, AND BARREL COVER CONTROL METHOD

CROSS-REFERENCE TO RELATED APPLICATION

This application claims priority to Chinese patent application No. 202120755749.2, filed Apr. 13, 2021, the content of which is incorporated herein by reference in its entirety.

TECHNICAL FIELD

The present disclosure relates to the technical field of articles for daily use, and more particularly, to a barrel cover with an encoder, a garbage bin, a barrel cover control method, a motor driver, and a non-transitory computer-readable storage medium.

BACKGROUND

Garbage bins are widely used in homes, factories, or public places as contains for loading household garbage or industrial garbage; the garbage bins can isolate industrial wastes harmful for human bodies, prevent the industrial wastes such as dust, poisonous gas, and waste water from polluting a working environment, and also prevent bacteria and viruses attached to the household garbage from diffusing into air; collecting the garbage using the garbage bins enables life and working environments to become clean, tidy, and healthful, and ensures the human body health. The garbage bin with a barrel cover can better separate the garbage from the environment; and in the existing garbage bins with a cover, a method for opening the barrel cover is generally implemented in a manual type, a pedal type, and an induction type. The barrel cover of the manual type garbage bin with a cover needs to be opened by hand, which has a health hazard; moreover, the pedal type garbage bin with a cover and the induction type garbage bin with a cover prevent a health risk of contacting by hand, but the barrel cover is generally connected to a barrel body through a simple mechanic structure, and the opening or closing speed of the barrel cover is unstable. When the cover is opened, an overquick opening of the barrel cover will cause the shaking the barrel body, so that the garbage in the barrel body is turned out, causing secondary pollution to the environment; during closing, if the barrel cover is closed too quickly, under the fanning by the barrel cover, the diffusion of gas in the barrel body to the surrounding environment will be accelerated, and the gas will be inhaled by a person near the garbage bin, which causes the health hazard as well as bad user experience; in addition, when the garbage bin is placed in an inclined manner, the barrel cover is separated from the barrel body under the function of its own gravity, and the garbage in the barrel body is leaked from a gap between the barrel cover and the barrel body, which will pollute the environment.

SUMMARY

The present disclosure aims at addressing at least one of technical problems existing in the existing technology. With this regard, the present disclosure provides a barrel cover with an encoder, a garbage bin, a barrel cover control method, a motor driver, and a non-transitory computer-readable storage medium, which can prevent garbage in a barrel body from polluting the environment and can improve user experience.

A barrel cover with an encoder according to a first aspect embodiment of the present disclosure includes:
- a housing provided with a cover opening, a first connecting base, and a second connecting base;
- a motor provided with an encoder and connected to the housing;
- a buffer, the first connecting base being rotatably connected to a first end of the buffer, and a rotary shaft of the motor being connected to the first end of the buffer;
- a driving shaft, an end of the driving shaft being rotatably connected to the second connecting base, and the other end of the driving shaft being connected to a second end of the buffer;
- a cover plate, connected to the driving shaft and configured to cover the cover opening; and
- a drive circuit, electrically connected to the motor and the encoder.

The barrel cover with an encoder according to the first aspect embodiment of the present disclosure at least has the following beneficial effects:

the barrel cover with an encoder includes a housing, a motor, a buffer, a driving shaft, a cover plate, and a drive circuit; the housing is provided with a cover opening for putting in garbage, a first connecting base, and a second connecting base; the motor is connected to the housing and fixed on the housing; the motor is provided with an encoder for detecting a motor rotation speed and a rotation angle; a first end of the buffer is rotatably connected to the first connecting base, the first connecting base enables the buffer to be fixed on the housing, a rotary shaft of the motor is connected to the first end of the buffer, and the buffer rotates under the drive of the motor; an end of the driving shaft is rotatably connected to the second connecting base, the other end of the driving shaft is connected to a second end of the buffer, the second connecting base and the buffer enable to the driving shaft to be fixed on the housing, and the driving shaft rotates around its own axial direction under the function of the buffer; the cover plate is connected to the driving shaft, the cover plate rotates with the rotation of the driving shaft, when the cover plate moves toward a direction of the cover opening and fits with the housing, the cover plate covers the cover opening, and when the cover plate moves away from the direction of the cover opening, the cover opening is opened, and an object can be transferred from a face of the housing to the other face of the housing through the cover opening; and the drive circuit is electrically connected to the motor and the encoder, the drive circuit obtains a rotation speed and a rotation angle of the motor according to a signal output by the encoder, and the drive circuit controls rotation of the rotary shaft of the motor. The barrel cover with an encoder in the present disclosure detects the rotation speed and rotation angle of the rotary shaft of the motor through the encoder; the drive circuit controls a motion speed of the cover plate according to the position of the cover plate so as to achieve the purpose of opening and closing the cover stably; the rotary shaft of the motor drives the cover plate to rotate through the buffer; the buffer can increase a torsion force of the rotary shaft of the motor and prevent the cover plate from departing from the control of the motor and sliding under the function of its own gravity or inertia; and the buffer enables the motor to stably control the movement of the cover plate. The barrel cover with an encoder of the present disclosure can prevent severe shaking of the garbage bin caused by an overquick speed or instability of cover opening for the cover plate, so as to prevent the garbage in the garbage bin from being dug out of the garbage pin; moreover, it can also prevent gas in the garbage bin from being fanned into an external environment outside the garbage bin due to an overquick speed or instability of cover closing for the cover plate; meanwhile, under the combined function of the motor, the encoder, the drive circuit, and the buffer, the cover plate and the housing can fit tightly, and even if under the condition that the garbage bin is placed in an inclined manner, the fit between the cover plate and the housing can still be ensured to prevent the garbage from being dropped out from the cover opening. As can be seen that the barrel cover with an encoder of the present disclosure can effectively prevent the garbage in the garbage bin from polluting the environment, prevent gas in the garbage bin from rushing to the user, improve the user experience, and ensure the user health.

According to some embodiments of this disclosure, the housing includes a face housing and a bottom housing; the face housing is provided with the cover opening, the first connecting base, and the second connecting base; the face housing is connected to the bottom housing to form an accommodating cavity; and the first connecting base, the second connecting base, the motor, the buffer, the driving shaft, and the drive circuit are disposed in the accommodating cavity.

According to some embodiments of this disclosure, a face of the bottom housing away from the face housing is provided with a battery compartment and a battery cover; the battery cover is connected to the bottom housing; the drive circuit is electrically connected to the battery compartment; the face housing is provided with a power switch; and the power switch is electrically connected to the battery compartment and the drive circuit.

According to some embodiments of this disclosure, a face of the cover plate is provided with a support seat; the support seat is provided with a first through hole; the driving shaft penetrates through the first through hole; a face of the cover plate adjacent to the support seat is provided with a first inner stud; the support seat is provided with a first screw hole; and the cover plate is connected to the support seat through the first inner stud and the first screw hole.

According to some embodiments of this disclosure, a face of the face housing adjacent to the first connecting base is provided with a second inner stud; the first connecting base is provided with a second screw hole; the first connecting base is connected to the face housing through the second inner stud and the second screw hole; a face of the face housing adjacent to the second connecting base is provided with a third inner stud; the second connecting base is provided with a third screw hole; the second connecting base is connected to the face housing through the third inner stud and the third screw hole and forms a second through hole; and the driving shaft penetrates through the second through hole.

According to some embodiments of this disclosure, the buffer includes a connecting head, a first connecting arm, and a second connecting arm; the connecting head is provided with a third through hole; a sidewall of the connecting head is provided with a connecting plate; the driving shaft penetrates through the third through hole; the connecting plate is in transmissive connection to an end of the first connecting arm; the other end of the first connecting arm is in transmissive connection to an end of the second connecting arm; the other end of the second connecting arm is provided with a connecting post; the first connecting base is provided with a connecting hole; the connecting post is rotatably connected to the connecting hole; and the rotary shaft of the motor is coaxially disposed with the connecting post.

According to some embodiments of this disclosure, an end of the driving shaft adjacent to the first connecting base is provided with a first torsion spring; the first torsion spring is disposed around the circumference of the driving shaft; an end of the first torsion spring abuts against the face housing; the other end of the first torsion spring is connected to the connecting head; an end of the driving shaft adjacent to the second connecting base is provided with a second torsion spring and a driving plate; the driving plate is connected to a sidewall of the driving shaft; the second torsion spring is disposed around the circumference of the driving shaft; an end of the second torsion spring abuts against the face housing; and the other end of the second torsion spring is connected to the driving plate.

According to some embodiments of this disclosure, the connecting post is provided with a third torsion spring; the third torsion spring is disposed around the circumference of the connecting post; a plurality of clamping slots are disposed on the first connecting base; an end of the third torsion spring abuts against the clamping slots; and the other end of the third torsion spring is connected to the second connecting arm.

According to some embodiments of this disclosure, the encoder is a magnetic ring encoder or a grating encoder.

According to some embodiments of this disclosure, a current detection module is further included, and the current detection module is electrically connected to the motor and the drive circuit.

A garbage bin according to a second aspect embodiment of the present disclosure includes a barrel body, a connecting frame, and the barrel cover with an encoder according to the first aspect embodiment above; the connecting frame is disposed along the circumference of the housing and is connected to the housing; the housing and the connecting frame form an accommodating slot; an end of the barrel body adjacent to a barrel opening is embedded into the accommodating slot; and the barrel opening is communicated with the cover opening.

The garbage bin according to the second aspect embodiment of the present disclosure at least has the following beneficial effects:

The garbage bin of the present disclosure includes the barrel body, the connecting frame and the barrel cover with an encoder of the first aspect embodiment; the barrel opening of the barrel body is communicated with the cover opening; and the cover plate of the barrel cover with an encoder can achieve the function of covering the barrel opening of the barrel body. When putting garbage into the garbage bin of this embodiment, the motor drives the cover plate to move away from the direction of the cover opening; the garbage enters the barrel body through the cover opening and the barrel opening; when the cover plate moves toward the cover opening and fits the housing, the cover plate can prevent the garbage and smell in the barrel body from leaking outside the barrel body, which effectively blocks the pollution of the garbage to the environment, and ensures human body health. The garbage bin of the present disclosure uses the barrel cover with an encoder of the first aspect embodiment, which can both prevent severe shaking of the barrel body caused by an overquick speed or instability of cover opening for the cover plate, so as to prevent the garbage in the barrel body from being dug out of the barrel body, and also prevent gas in the barrel body from being fanned into the external environment outside the barrel body due to an overquick speed or instability of cover closing for the cover plate; meanwhile, it can also ensure that the cover plate and the housing fit tightly; and under the condition that the garbage bin is placed in an inclined manner or knocked down, the garbage would not be poured out from the barrel body. The garbage bin of the present disclosure can prevent the garbage in the barrel body from polluting the environment again, prevent gas in the barrel body from rushing to the user and making the user uncomfortable, improve the user experience, and ensure the user health.

A barrel cover control method according to a third aspect embodiment of the present disclosure is applied to a barrel cover with an encoder; the barrel cover with an encoder includes a housing, a motor, a buffer, a driving shaft, a cover plate, and a drive circuit; the housing is provided with a cover opening, a first connecting base, and a second connecting base; the motor is provided with the encoder; the motor is connected to the housing; the first connecting base is rotatably connected to a first end of the buffer; a rotary shaft of the motor is connected to the first end of the buffer; an end of the driving shaft is rotatably connected to the second connecting base; the other end of the driving shaft is connected to a second end of the buffer; the cover plate is connected to the driving shaft; and the drive circuit is electrically connected to the motor and the encoder; and A barrel cover control method according to a third aspect embodiment of the present disclosure is applied to a barrel cover with an encoder and a stabilization device; the barrel cover with an encoder and a stabilization device includes a housing, a motor, a buffer, a driving shaft, a cover plate, and a drive circuit; the housing is provided with a cover opening, a first connecting base, and a second connecting base; the motor is provided with the encoder; the motor is connected to the housing; the first connecting base is rotatably connected to a first end of the buffer; a rotary shaft of the motor is connected to the first end of the buffer; an end of the driving shaft is rotatably connected to the second connecting base; the other end of the driving shaft is connected to a second end of the buffer; the cover plate is connected to the driving shaft; and the drive circuit is electrically connected to the motor and the encoder; and the barrel cover control method includes:

obtaining, by the drive circuit, an encoding signal output by the encoder, and calculating an operation parameter of the motor;

outputting, by the drive circuit, a drive electric signal to the motor according to the operation parameter; and driving, by the motor, the cover plate to rotate in response to the drive electric signal and through the buffer and the driving shaft.

The barrel cover control method according to the third aspect embodiment of the present disclosure has at least the following beneficial effects:

For the barrel cover with an encoder applied with the barrel cover control method of the present disclosure, the drive circuit thereof can obtain the rotation speed and rotation angle of the motor through the encoder and control the operation state of the motor according to the rotation speed and rotation angle of the motor, so that the motor can stably drive the cover plate to rotate. The barrel cover control method of the present disclosure can both prevent severe shaking of the garbage bin caused by an overquick speed or instability of cover opening for the cover plate, and can also prevent gas in the garbage bin from being fanned into an external environment outside the garbage bin due to an overquick speed or instability of cover closing for the cover plate; in addition, it can make the cover plate and the housing fit tightly, and under the condition that the garbage bin is placed in an inclined manner, the garbage is prevented from being leaked from a gap between the cover plate and the housing, thereby effectively improving the user experience and ensuring the user health.

According to some embodiments of this disclosure, the operation parameter comprises a rotation speed and a rotation angle of the motor; and outputting, by the drive circuit, a drive electric signal to the motor according to the operation parameter, includes at least one of:

outputting, by the drive circuit, a rotation speed adjusting electric signal to the motor if the rotation angle is not equal to a preset angle value and the rotation angle increases or decreases;

outputting, by the drive circuit, a rotation stop electric signal to the motor if the rotation angle is not equal to the preset angle value and the rotation angle is maintained unchanged; and outputting, by the drive circuit, the rotation stop electric signal to the motor if the rotation angle is equal to the preset angle value.

According to some embodiments of this disclosure, the outputting, by the drive circuit, a rotation speed adjusting electric signal to the motor if the rotation angle is not equal to a preset angle value and the rotation angle increases or decreases, includes at least one of:

outputting, by the drive circuit, a rotation speed maintaining electric signal to the motor if the rotation speed is equal to a preset speed value;

outputting, by the drive circuit, a speed reducing electric signal to the motor if the rotation speed is greater than the preset speed value; and outputting, by the drive circuit, an accelerating electric signal to the motor if the rotation speed is less than the preset speed value.

According to some embodiments of this disclosure, the barrel cover with an encoder to which the method is applied further comprises a current detection module, electrically connected to the motor and the drive circuit; and the barrel cover control method further includes:

obtaining, by the drive circuit, a current signal output by the current detection module and calculating a working current of the motor; and outputting, by the drive circuit, a rotation stop electric signal to the motor if the working current is greater than a current threshold; and obtaining, by the drive circuit, a current signal output by the current detection module and calculating a working current of the motor; and outputting, by the drive circuit, a drive electric signal to the motor according to the operation parameter if the working current is small than or equal to the current threshold.

A motor driver according to a fourth aspect embodiment of the present disclosure includes at least one processor to be in communication connection to an encoder and at least a memory to be in communication connection to the processor, the memory stores instructions being executable by the processor, and when the instructions are executed by the processor, cause the processor to perform the barrel cover control method of the third aspect embodiment above.

A non-transitory computer-readable storage medium according to a fifth aspect embodiment of the present disclosure stores computer-executable instructions which, when executed by a computer, cause the computer to perform the barrel cover control method of the third aspect embodiment above.

Additional aspects and advantages of the present disclosure will be given in the following description, some of which will become apparent from the following description or may be learned from practices of the present disclosure.

BRIEF DESCRIPTION OF DRAWINGS

The foregoing and/or additional aspects and advantages of the present disclosure will become apparent and comprehensible in the description of embodiments made with reference to the following accompanying drawings, where.

DESCRIPTION OF EMBODIMENTS

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are only adopted to explain the present disclosure and cannot be construed as a limitation to the present disclosure.

In the description of the present disclosure, the description of first, second, and third are used merely for the purpose of distinguishing the technical features, and shall not be understood as indicating or implying relative importance or implying a quantity of indicated technical features or implying a precedence relationship of the indicated technical features.

In the description of the present disclosure, unless otherwise explicitly defined, words such as setting, mounting, and connecting should be widely understood; a person skilled in the art can reasonably determine the specific meanings of said words in the present disclosure by combining specific contents of the technical solution.

The barrel cover with an encoder according to the first aspect embodiment of the present disclosure is described in detail below by combining the accompanying drawings.

Figure 1:
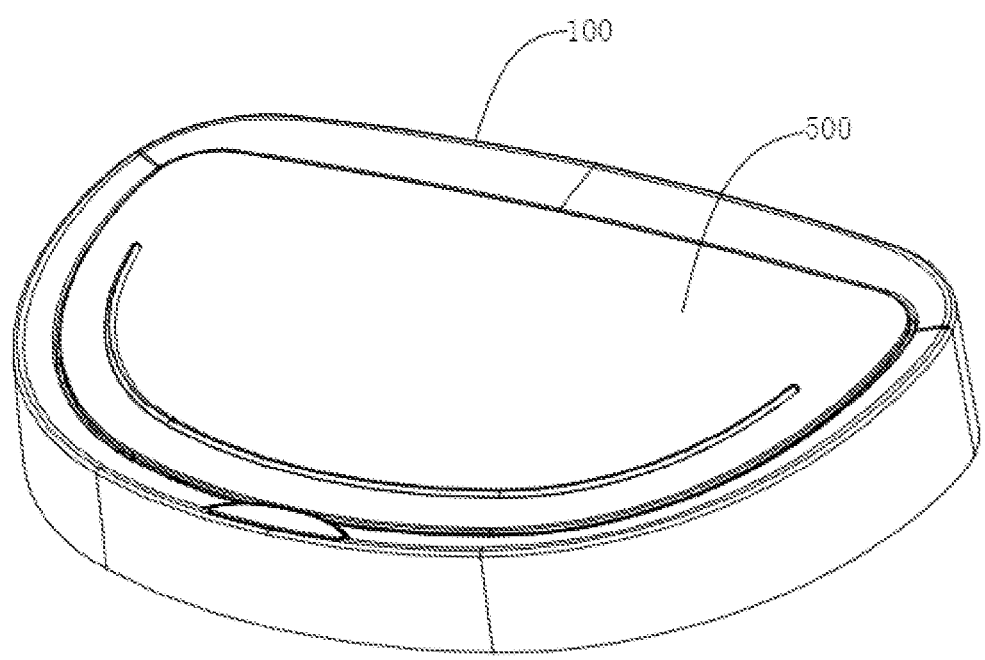
FIG. 1 is an overall schematic diagram of a barrel cover with an encoder according to an embodiment of the present disclosure.
Figure 2:
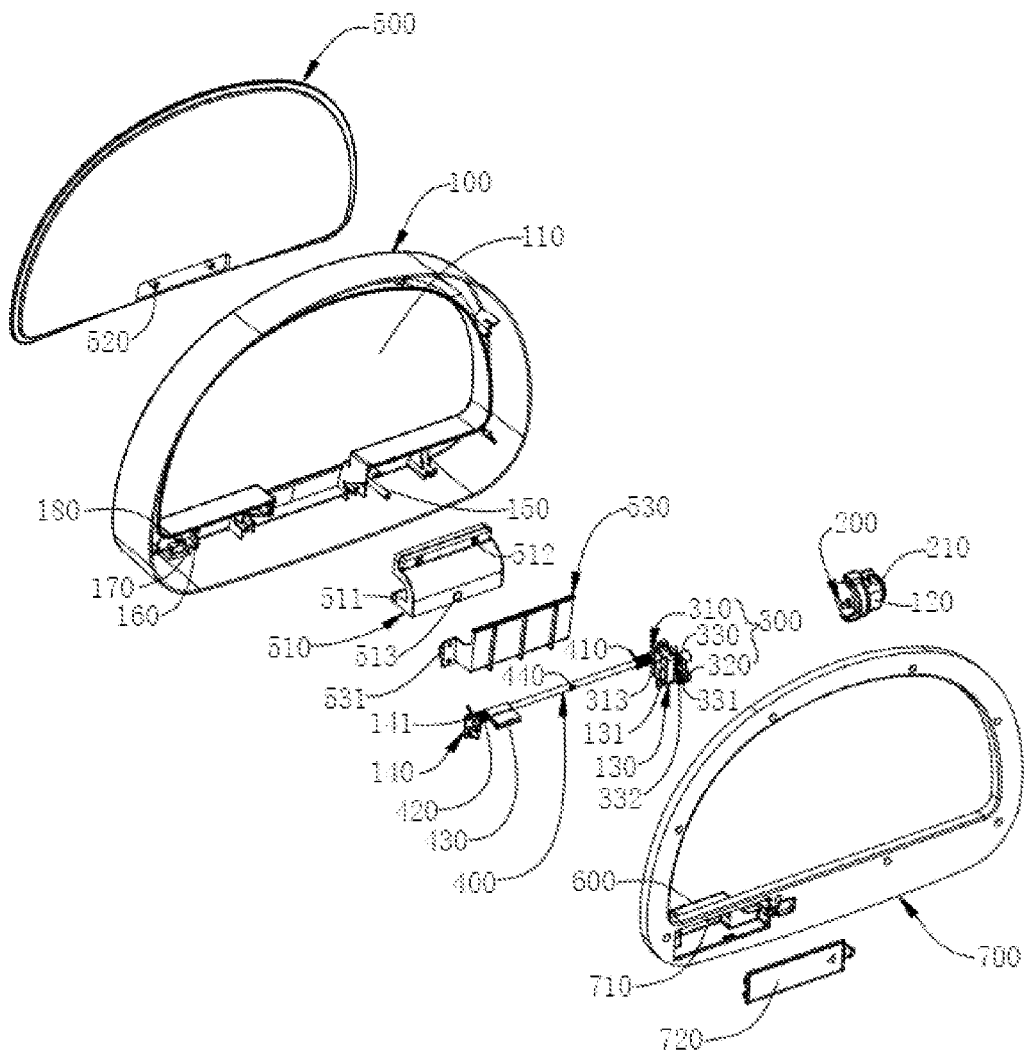
FIG. 2 is an exploded schematic diagram of a barrel cover with an encoder according to another embodiment of the present disclosure.
Figure 3:
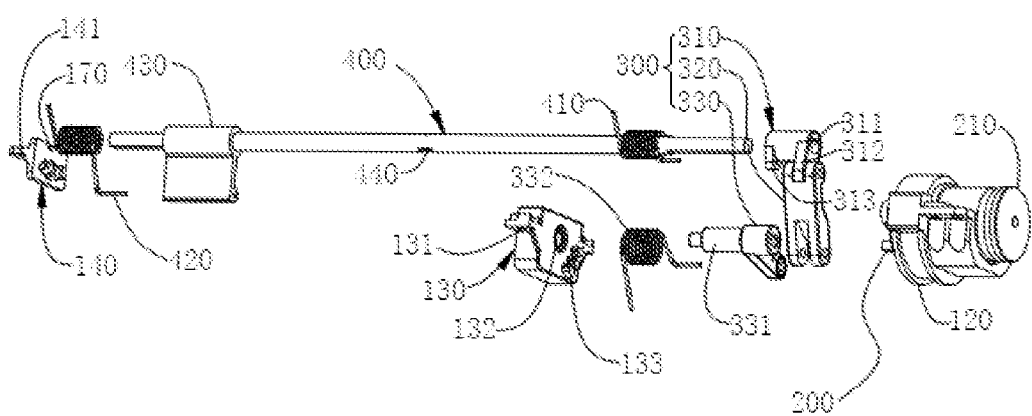
FIG. 3 is an exploded schematic diagram of a buffer of a barrel cover with an encoder according to another embodiment of the present disclosure.

Referring to FIG. 1, FIG. 2, and FIG. 3, an embodiment of the present disclosure provides a barrel cover with an encoder, including a housing, a motor 200, a buffer 300, a driving shaft 400, a cover plate 500, and a drive circuit 600. The housing includes a face housing 100 and a bottom housing 700. A cover opening 110 for putting in garbage is disposed at a middle portion of the face housing 100; the bottom housing 700 is connected to the face housing 110 to form an accommodating cavity; the motor 200, the buffer 300, the driving shaft 400, and the drive circuit 600 are disposed in the accommodating cavity; and the bottom housing 700 achieves functions of protecting the motor 200, the buffer 300, the driving shaft 400, and the drive circuit 600, preventing the motor 200, the buffer 300, the driving shaft 400, and the drive circuit 600 from being interfered by foreign matters or corroded by liquid, and extending the service life of this embodiments. The housing of the motor 200 is fixedly connected to a face of the face housing 100 adjacent to the bottom housing 700 through a motor rack 120; and the motor 200 is provided with an encoder 210 for detecting a rotation speed and a rotation angle of the motor 200. A face of the face housing 100 adjacent to the bottom housing 700 is provided with a first connecting base 130 and a second connecting base 140; a first end of the buffer 300 is rotatably connected to the first connecting base 130; the first connecting base 130 enables the butter 300 to be fixed at a face of the face housing 100; a rotary shaft of the motor 200 is connected to the first end of the buffer 300; and the buffer 300 rotates under the drive of the motor 200. An end of the driving shaft 400 is rotatably connected to the second connecting base 140; the other end of the driving shaft 400 is connected to a second end of the buffer 300; the second connecting base 140 and the buffer 300 enable the driving shaft 400 to be fixed at the face of the face housing 100 adjacent to the bottom housing 700; the driving shaft 400 rotates around its own axial direction under the function of the buffer 300. The cover plate 500 is connected to the driving shaft 400, the cover plate 500 rotates with the rotation of the driving shaft 400, when the cover plate 500 moves toward a direction of the cover opening 110 and fits with the face housing 100, the cover plate 500 covers the cover opening 110, and when the cover plate 500 moves away from the direction of the cover opening 110, the cover opening 110 opens, and garbage can be transferred from a face of the face housing 100 to the other face of the face housing 100 through the cover opening 110; and the drive circuit 600 is electrically connected to the motor 200 and the encoder 210 on the motor 200, the drive circuit 600 obtains a rotation speed and a rotation angle of the motor 200 according to a signal output by the encoder 210, and the drive circuit 600 outputs a drive electric signal to the motor 200 to control rotation of the rotary shaft of the motor 200. The barrel cover with an encoder of the present disclosure detects the rotation speed and rotation angle of the rotary shaft of the motor 200 through the encoder 210; the drive circuit 600 obtains the position and motion speed of the cover plate 500 according to an output signal of the encoder 210; the drive circuit 600 controls a motion speed of the cover plate 500 so as to achieve opening and closing the cover stably; the rotary shaft of the motor 200 drives the cover plate 500 to rotate through the buffer 300; the buffer 300 can increase a torsion force of the rotary shaft of the motor 200 and prevent the cover plate 500 from departing from the control of the motor 200 and slide under the function of its own gravity or inertia; and the buffer 300 enables the motor 200 to stably control the movement of the cover plate 500. The barrel cover with an encoder of this embodiment can prevent severe shaking of the garbage bin caused by an overquick speed or instability of cover opening for the cover plate 500, so as to prevent the garbage in the garbage bin from being dug out of the garbage pin; moreover, it can also prevent gas in the garbage bin from being fanned into an external environment outside the garbage bin caused by an overquick speed or instability of cover closing for the cover plate 500; meanwhile, under the combined function of the motor 200, encoder 210, drive circuit 600, and buffer 300, the drive circuit 600 can accurately control an action of the cover plate 500, so that the cover plate 500 and the housing 100 can be fit tightly, and even if under the condition that the garbage bin is placed in an inclined manner, the fit between the cover plate 500 and the housing 100 can still be ensured to prevent the garbage from being dropped out from the cover opening 110. As can be seen that the barrel cover with an encoder of this embodiment can effectively prevent the garbage in the garbage bin from polluting the environment, thereby preventing gas in the garbage bin from rushing to the user, improving the user experience, and ensuring the user health.

In some embodiments, a face of the cover plate 500 adjacent to the bottom housing 700 is provided with a support seat 510; the support seat 510 is provided with a first through hole 511; the driving shaft 400 penetrates through the first through hole 511; a face of the cover plate 500 adjacent to the support seat 510 is provided with a first inner stud 520; the support seat 510 is provided with a first screw hole 512; and the cover plate 500 is connected to the support seat 510 through the first inner stud 520, the first screw hole 512, and a first screw penetrating through the first inner stud 520 and the first screw hole 512. In this embodiment, a first limiting hole 440 is disposed on the driving shaft 400; a second limiting hole 513 corresponding to the first limiting hole 440 is disposed in the support seat 510; the driving shaft 400 is connected to the support seat 510 through a limiting post penetrating through the first limiting hole 440 and the second limiting hole 513, so as to avoid relative sliding between the support seat 510 and the driving shaft 400 when the cover plate 500 rotates, so that the cover plate 500 can be stably opened and closed; supporting the cover plate 500 through the support seat 510 can increase a contact area between the cover plate 500 and the driving shaft 400 and can avoid swinging during a moving process of the cover plate 500 while enhancing the strength of the cover plate 500 to enhance the stability during the movement of the cover plate 500; and a connection mode between the cover plate 500 and the support seat 510 is simple and facilitates to remove the cover plate 500 and clean same.

A face of the face housing 100 adjacent to the first connecting base 130 is provided with a second inner stud 150; the first connecting base 130 is provided with a second screw hole 131; the first connecting base 130 is connected to the face housing 100 through the second inner stud 150, the second screw hole 131 and a second screw penetrating through the second inner stud 150 and the second screw hole 131; a face of the face housing 100 adjacent to the second connecting base 140 is provided with a third inner stud 160; the second connecting base 140 is provided with a third screw hole 141; the second connecting base 140 is connected to the face housing 100 through the third inner stud 160, the third screw hole 141 and a third screw penetrating through the third inner stud 160 and the third screw hole 141 and forms a second through hole 170; and an end of the driving shaft 400 penetrates through the second through hole 170. The connection mode between the face housing 100 and the first connecting base 130 or the second connecting base 140 of this embodiment is simple, and it is easy to be removed, facilitating removing, cleaning, and maintaining of the driving shaft 400 and the support seat 510.

The buffer 300 includes a connecting head 310, a first connecting arm 320, and a second connecting arm 330; the connecting head 310 is provided with a third through hole 311; the driving shaft 400 penetrates through the third through hole 311; two ends of the driving shaft 400 respectively penetrate through the second through hole 170 and the third through hole 311; an axial direction of the driving shaft 400 is parallel to a plane where the cover opening 110 is located; two ends of the driving shaft 400 are respectively supported by the second through hole 170 and the third through hole 311, so that the driving shaft 400 can stably rotate around its own axial direction. A sidewall of the connecting head 310 is provided with a connecting plate 312; the connecting plate 312 is hinged with an end of the first connecting arm 320; the other end of the first connecting arm 320 is hinged with an end of the second connecting arm 330; the other end of the second connecting arm 330 is provided with a connecting post 331; the first connecting base 130 is provided with a connecting hole 132 corresponding to the connecting post 331; the connecting post 331 is disposed in the connecting hole 132 and is rotatably connected to the connecting hole 132; and the rotary shaft of the motor 200 is coaxially disposed with the connecting post 331 and is connected to a face of the second connecting arm 330 away from the connecting post 331. The rotary shaft of the motor 200 drives the driving shaft 400 to rotate through the second connecting arm 330, the first connecting arm 320, and the connecting head 310; the second connecting arm 330, the first connecting arm 320, and the connecting head 310 can increase a torsion force of the rotary shaft of the motor 200 and prevent the cover plate 500 from being departed from the control of the motor 200 to rapid slide or shake under the function of its own gravity or inertia, and ensure the cover plate 500 can stably move according to a set speed.

It should be further explained that the buffer 300 mentioned in the present disclosure may be consist of the connecting head 310, the first connecting arm 320, and the second connecting arm 330 in the embodiment above; the connecting head 310, the first connecting arm 320, and the second connecting arm 330 are in transmissive connection by means of hinging, and a gear, screw post, worm, lead screw, thread, or indented transmissive mechanism may also be disposed on the connecting head 310, the first connecting arm 320, and the second connecting arm 330; the transmissive connection among the connecting head 310, the first connecting arm 320, and the second connecting arm 330 is implemented through engaging by the gear, screw post, worm, lead screw, thread, or indented transmissive mechanism; the buffer 300 may also include a gear, a gear shaft, a screw post, a worm, a lead screw, or other parts; the driving shaft 400 and the motor 200 are in the transmissive connection through the parts. The buffer 300 in this embodiment is only exemplary, rather than limiting the transmissive mode between the motor 200 and the driving shaft 400; in the range of knowledge mastered by a person of ordinary skill in the technical field, various changes may also be made without departing from the purpose of the present disclosure.

Furthermore, a face of the bottom housing 700 away from the face housing 100 is provided with a battery compartment 710 and a battery cover 720; the battery cover 720 is connected to the bottom housing 700; the battery cover 720 enables a battery to be sealed in the battery compartment 710, preventing the battery from being polluted and corroded by the garbage. The battery compartment 710 is provided with a copper piece electrically connected to the battery; the copper piece is electrically connected to the drive circuit 600; the drive circuit 600 is powered by the battery in the battery compartment. A side face of the face housing 100 is provided with a power switch 180; the power switch 180 is connected in series between the battery compartment and the drive circuit 600; the power source of the drive circuit 600 can be cut down through the power switch 180; the user can control the opening and closing of the cover plate 500 manually. The barrel cover with an encoder of this embodiment can flexibly control the opening and closing of the cover plate 500, so that this embodiment can flexibly be applied to difference scenes; when a fault occurs to the motor 200, the user can still use the garbage bin of this embodiment for garbage storage.

An end of the driving shaft 400 adjacent to the first connecting base 130 is provided with a first torsion spring 410; the first torsion spring 410 is disposed around the circumference of the driving shaft 400; an end of the first torsion spring 410 abuts against the face housing 100; a sidewall of the connecting head 310 is provided with a bump 313; a first fixation hole is disposed on the bump 313; the other end of the first torsion spring 410 penetrates into the first fixation hole. An end of the driving shaft 400 adjacent to the second connecting base 140 is provided with a second torsion spring 420 and a driving plate 430; an end of the driving plate 430 is disposed around the circumference of the driving shaft 400 and is connected to the sidewall of the driving shaft 400; the second torsion spring 420 is disposed around the circumference of the driving shaft 400; an end of the second torsion spring 420 abuts against the face housing 100; an end of the driving plate 430 away from the driving shaft 400 is provided with a second fixation hole; and the other end of the second torsion spring 420 penetrates into the second fixation hole. When the cover plate 500 moves toward a direction away from the cover opening 110; the first torsion spring 410 and the second torsion spring 420 are twisted and elastic deformation occurs to generate an action force on the cover plate 500 toward the direction of the cover opening 110, to buffer the torsion force generated to the driving shaft 400 by the motor 200, to prevent the shaking of the garbage bin caused by rapid raising of the cover plate 500 when the motor 200 suddenly starts, and to ensure the stable movement of the cover plate 500; when the power source of the drive circuit 600 is disconnected, the cover plate 500 moves toward a direction away from the cover opening 110 manually; the first torsion spring 410 and the second torsion spring 420 generates an action force on the cover plate 500 to make the cover plate 500 to move toward a direction of the cover opening 110; the cover plate 500 can automatically move toward the direction of the cover opening 110 and fit with the face housing 100 to prevent the garbage in the garbage bin to pollute the environment outside the garbage bin; after the user opens the cover plate 500, the cover plate 500 does not need to be opened and closed manually; the operation is easy, and the user experience can be effectively improved; the first torsion spring 410 and the second torsion spring 420 are respectively disposed at two ends of the driving shaft 400; and the action force generated by the first torsion spring 410 and the second torsion spring 420 to the driving shaft 400 through the connecting head 310 and the driving plate 430 is distributed on two ends of the driving shaft 400, so that the driving shaft 400 is subjected to an even force, and the cover plate 500 can be ensured to move stably.

The connecting post 331 is provided with a third torsion spring 332; the third torsion spring 332 is disposed around the circumference of the connecting post 331; three clamping slots 133 are disposed on the first connecting base 130; a third fixation hole is disposed on the second connecting arm 330; an end of the third torsion spring 332 abuts against the clamping slots 133; and the other end of the third torsion spring 332 penetrates into the third fixation hole. The third torsion spring 332 achieves the function of assisting the buffer 300 to support the cover plate 500. When the cover plate 500 moves toward the direction of the face housing 100, the first connecting base 130 and the second connecting arm 330 enable the third torsion spring 332 to be subjected to elastic deformation; the third torsion spring 332 generates an assistant forces on the cover plate 500 for enabling the cover plate 500 to move toward a direction away from the face housing 100 to prevent the cover plate 500 from rapidly moving toward the direction of the face housing 100 without the control of the torsion force of the rotary shaft of the motor 200 under the influence of its own gravity or inertia, and improve the stability of the movement of the cover plate 500. The clamping slots 133 are disposed around the circumference of the connecting hole 132; connecting the third torsion spring 332 on different clamping slots 133 can adjust the size of the assistant force generated by the third torsion spring 332 to the cover plate 500; the barrel cover with an encoder of this embodiment can be adapted to the cover plates 500 in different weights, facilitating exchange of the cover plate 500.

In addition, to reinforce the stability of the driving shaft 400, an reinforcing seat 530 is further disposed at a face of the support seat 510 away from the cover plate 500; the reinforcing seat 530 is connected to a face of the face housing 100 adjacent to the driving shaft 400; the reinforcing seat 530 is provided with a support stage 531; the driving shaft 400 is rotatably connected to the support stage 531, and the reinforcing seat 530 functions to support the driving shaft 400.

Figure 4:
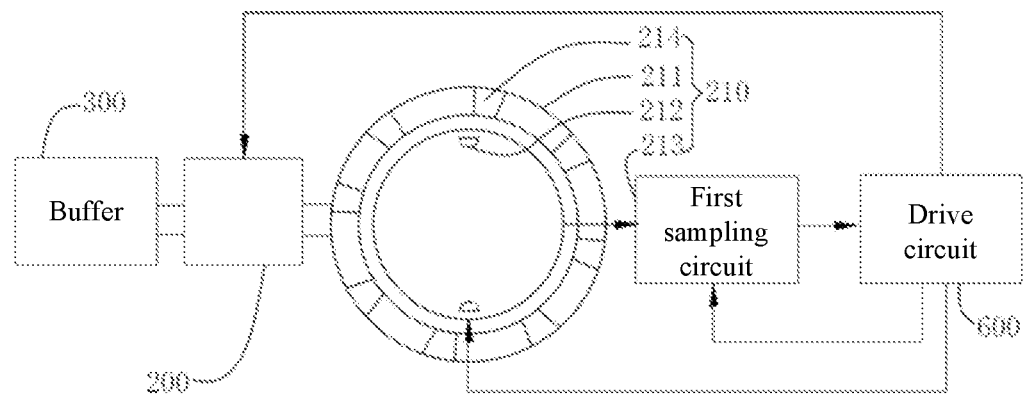
FIG. 4 is a schematic block diagram of a magnetic ring encoder of a barrel cover with an encoder according to another embodiment of the present disclosure.

Referring to FIG. 4, another embodiment of the present disclosure provides a barrel cover with an encoder. Based on the embodiment above, the encoder 210 is a magnetic ring encoder; the encoder 210 includes a magnetic ring 211, a first sampling circuit 213, and at least a Hall sensor 212; the magnetic ring 211 is in transmissive connection to the rotary shaft of the motor 200; the magnetic ring 211 is provided with at least one magnetic pole 214; the Hall sensor 212 is disposed along the circumference of the magnetic ring 211; the Hall sensor 212 is electrically connected to the first sampling circuit 213; the first sampling circuit 213 is electrically connected to the drive circuit 600; in this embodiment, the number of the magnetic poles 214 is eight, and the number of the Hall sensors 212 is two. The magnetic ring 211 rotates with the rotation of the rotary shaft of the motor 200; a relative position between the magnetic pole 214 in the magnetic ring 211 and the Hall sensor 212 changes; the Hall sensor 212 outputs an electric signal corresponding to the position of the magnetic pole 214 to the first sampling circuit 213; the first sampling circuit 213 encodes the electric signal output by the Hall sensor 212 and outputs to the drive circuit 600; the drive circuit 600 obtains the rotation speed and rotation angle of the rotary shaft of the motor 200 according to the encoding signal output by the first sampling circuit 213.

Figure 5:
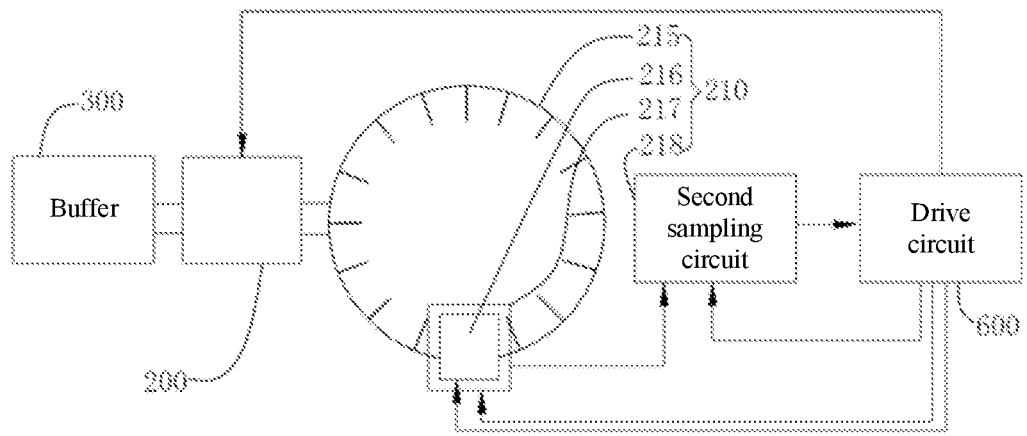
FIG. 5 is a schematic block diagram of a grating encoder of a barrel cover with an encoder according to another embodiment of the present disclosure.

Referring to FIG. 5, another embodiment of the present disclosure provides a barrel cover with an encoder. Based on the embodiment above, the encoder 210 is a grating encoder; the encoder 210 includes a transmitting turntable 215, an infrared emitter 216, an infrared receiver 217, and a second sampling circuit 218; the transmitting turntable 215 is in transmissive connection to the rotary shaft of the motor 200; a plurality of stripped-shaped gratings axially disposed along the transmitting turntable 215 are evenly printed on a circumferential direction of the transmitting turntable 215; the transmitting turntable 215 is disposed between the infrared emitter 216 and the infrared receiver 217; the infrared emitter 216 and the infrared receiver 217 are electrically connected to the second sampling circuit 218; and the second sampling circuit 218 is electrically connected to the drive circuit 600. The transmitting turntable 215 rotates with the rotation of the rotary shaft of the motor 200; the strip-shaped grating on the transmitting turntable 215 intermittently cuts an optical path between the infrared emitter 216 and the infrared receiver 217; the infrared receiver 217 outputs an electric signal reflecting on-and-off condition of the optical path to the second sampling circuit 218; the second sampling circuit 218 encodes the electric signal output by the infrared receiver 217 and outputs to the drive circuit 600; and the drive circuit 600 obtains the rotation speed and rotation angle of the rotary shaft of the motor 200 according to the encoding signal output by the second sampling circuit 218.

Figure 6:
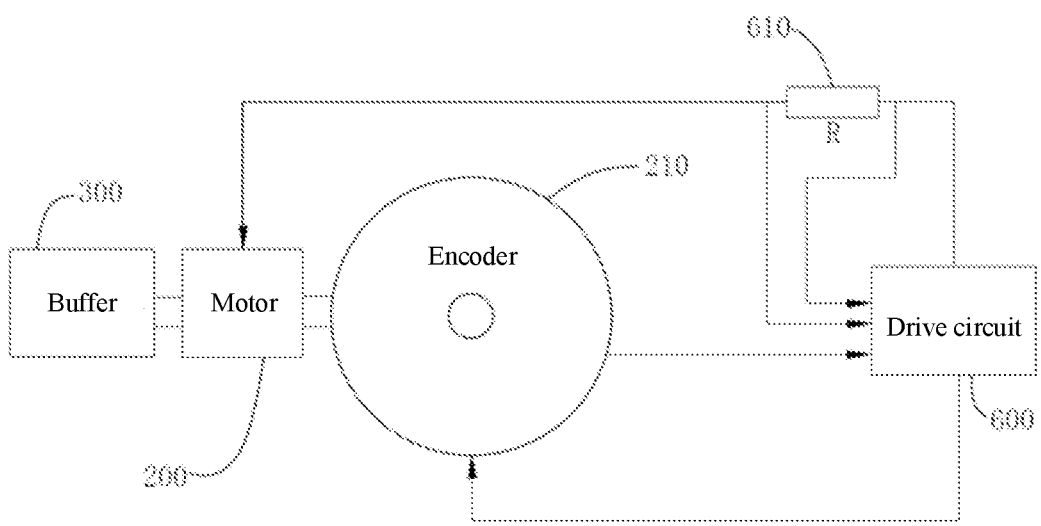
FIG. 6 is a schematic block diagram of a current detection module of a barrel cover with an encoder according to another embodiment of the present disclosure.

Referring to FIG. 6, another embodiment of the present disclosure provides a barrel cover with an encoder; based on the embodiment above, the barrel cover with an encoder further includes a current detection module 610. In this embodiment, the current detection module 610 is connected in series between the motor 200 and the drive circuit 600, and therefore, a value of a current passing through the current detection module 610 is equal to the working current of the motor 200. The current detection module 610 is connected to a signal of the drive circuit 600 to output to the drive circuit 600 a current signal including the working current information of the motor 200; the drive circuit 600 calculates the working current of the motor 200 through the current signal. When the working current of the motor 200 is greater than a preset current threshold, the drive circuit 600 enables the motor 200 to stop rotation to prevent the motor 200 from being burned down; when the working current of the motor 200 is less than or equal to the present current threshold and the cover plate 500 has not reached the reset angle value, the drive circuit 600 drives the rotary shaft of the motor 200 to rotate. Specifically, the current detection module 610 may be a resistor; the drive circuit 600 detects voltages at both ends of the resistor through an analog-digital conversion unit, so as to calculate a current passing through the resistor, i.e., the working current of the motor 200; it should be explained that the current detection module 610 can also be an integrated circuit consisting of a resistor, an analog-digital converter, and other modules, or a circuit module consisting of a resistor, an analog-digital converter, and other independent devices; it can also be other chips, integrated circuits, or circuit modules consisting of discrete components and devices for measuring a current signal in a circuit in a series connection; the current information output by these chips, integrated circuits, or circuit modules consisting of discrete components and devices to the drive circuit 600 can be an analog signal and can also be a converted digital signal. It should be further explained that the current detection module 610 can further be other chips, integrated circuits, or circuit modules consisting of discrete components and devices for measuring the working current of the motor 200 in a parallel connection to the motor 200. This embodiment is merely used for explaining the technical solution of the present invention, rather than limiting specific implementations of the current detection module 610. The garbage bin according to the second aspect embodiment of the present disclosure is described in detail below by combining the accompanying drawings.

Figure 7:
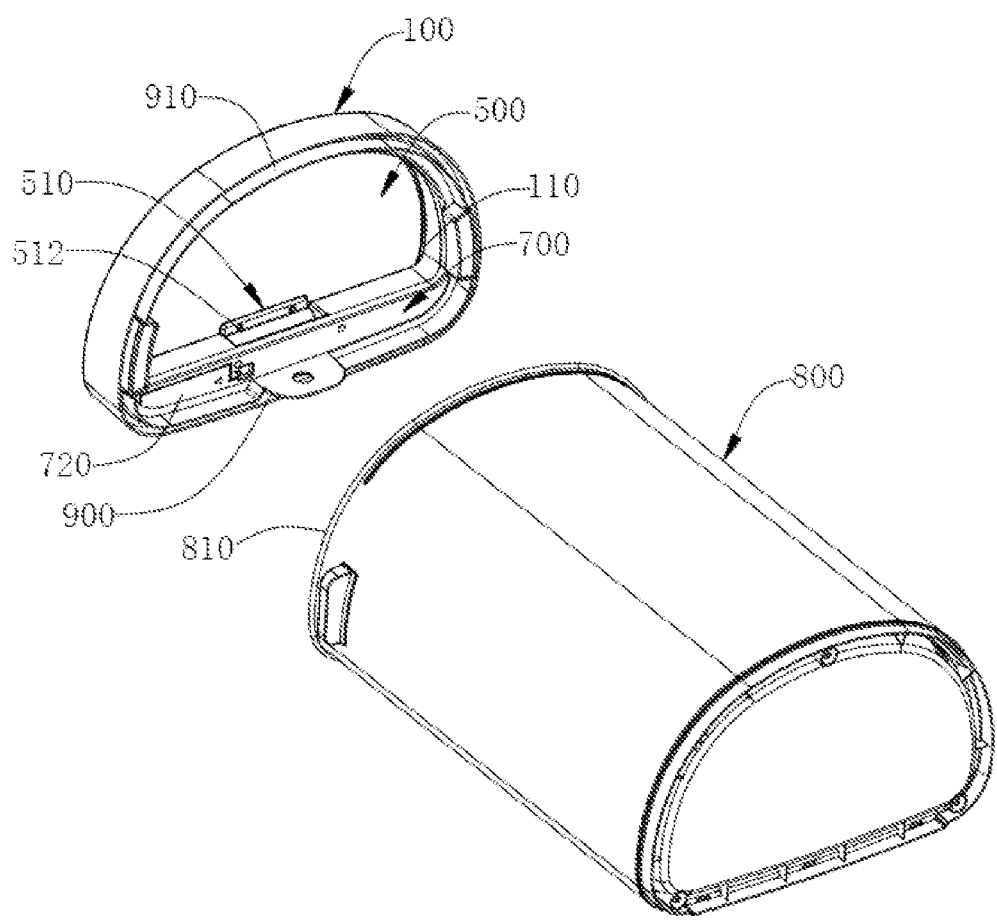
FIG. 7 is an exploded schematic diagram of a garbage bin according to an embodiment of the present disclosure.
Figure 8:
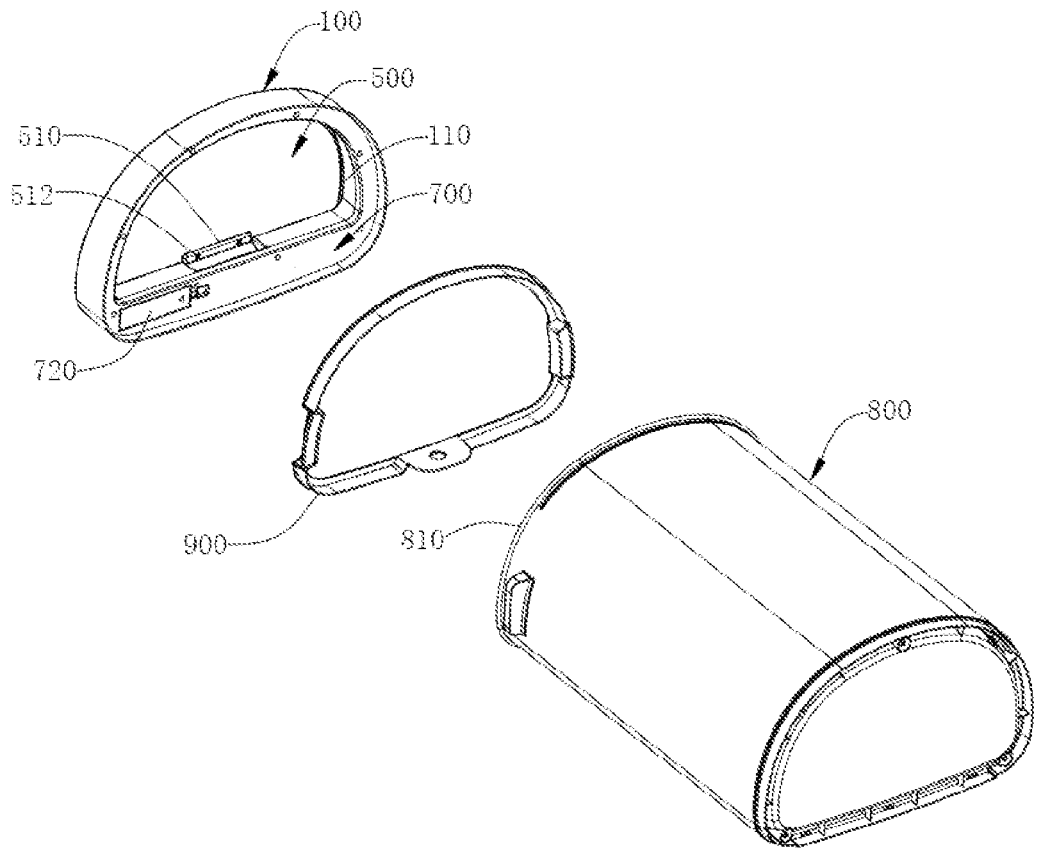
FIG. 8 is an exploded schematic diagram of a garbage bin according to another embodiment of the present disclosure.

Referring to FIG. 7 and FIG. 8, an embodiment of the present disclosure provides a garbage bin, which includes a barrel body 800, a connecting frame 900, and the barrel cover with an encoder of the first aspect embodiment; the connecting frame 900 is disposed along the circumference of the face housing 100 and is connected to the bottom housing 700 of the housing; a sidewall of the face housing 100 and the connecting frame 900 form an accommodating slot 910; an end of the barrel body 800 adjacent to a barrel opening 810 is embedded into the accommodating slot 910; and the barrel opening 810 is communicated with the cover opening 110. When putting garbage into the garbage bin of this embodiment, the motor 200 drives the cover plate 500 to move away from the direction of the cover opening 110; the garbage enters the barrel body 800 through the cover opening 110 and the barrel opening 810; when the cover plate 500 moves toward the cover opening 110 and fits the face housing 100 of the housing, the cover plate 500 can prevent the garbage and smell in the barrel body 800 from leaking outside the barrel body 800, which effectively blocks the pollution of the garbage to the environment, and ensures human body health. The garbage bin of the present disclosure uses the barrel cover with an encoder of the first aspect embodiment, which can both prevent severe shaking of the barrel body 800 caused by an overquick speed or instability of cover opening for the cover plate 500, so as to prevent the garbage in the barrel body 800 from being dug out of the barrel body 800, and also prevent gas in the barrel body 800 from being fanned into the external environment outside the barrel body 800 caused by an overquick speed or instability of cover closing for the cover plate 500, avoiding uncomfortable feelings of the user caused by the gas in the barrel body 800; and under the condition that the garbage bin of this embodiment is placed in an inclined manner or knocked down, the garbage in the barrel body 800 would not be leaked outside the barrel body 800 through the cover opening 110. The garbage bin of the present disclosure can prevent the garbage in the barrel body 800 from polluting the environment again, thereby improving the user experience, and ensuring the user health.

The garbage bin of the present disclosure includes the barrel cover with an encoder according to any embodiment above, and therefore, the garbage bin of the present disclosure has the technical effect brought by the barrel cover with an encoder according to any embodiment above. Hence, for the specific technical effects of the garbage bin of the embodiment of the present disclosure, reference may be made to the technical effects of the barrel cover with an encoder according to any embodiment above, and are omitted herein for brevity.

The barrel cover control method according to the third aspect embodiment of the present disclosure is described in detail below by combining the accompanying drawings.

Referring to FIG. 1, FIG. 2, FIG. 3, and FIG. 9, an embodiment of the present disclosure provides a barrel cover control method applied to a barrel cover with an encoder; the barrel cover with an encoder includes a housing, a motor 200, a buffer 300, a driving shaft 400, a cover plate 500, and a drive circuit 600. The housing includes a face housing 100 and a bottom housing 700; the face housing 100 is provided at the middle with the cover opening 110 for putting garbage; the first connecting base 130 and the second connecting base 140 are disposed at a face of the face housing 100 adjacent to the bottom housing 700; the bottom housing 700 is connected to the face housing 100 to form an accommodating cavity; and the motor 200, the buffer 300, the driving shaft 400, and the drive circuit 600 are disposed in the accommodating cavity. The motor 200 is connected to a face of the face housing 100 adjacent to the bottom housing 700; and the motor 200 is provided with an encoder 210. A first end of the buffer 300 is rotatably connected to the first connecting base 130; a rotary shaft of the motor 200 is connected to the first end of the buffer 300; and the buffer 300 rotates under the drive of the motor 200. An end of the driving shaft 400 is rotatably connected to the second connecting base 140; the other end of the driving shaft 400 is connected to a second end of the buffer 300; the driving shaft 400 rotates around its own axial direction under the function of the buffer 300. The cover plate 500 is connected to the driving shaft 400; the cover plate 500 rotates with the rotation of the driving shaft 400; when the cover plate 500 moves toward the direction of the cover opening 110 and fits with the face housing 100, the cover plate 500 covers the cover opening 110; and when the cover plate 500 moves toward a direction away from the cover opening 110, the cover opening 110 is opened. The drive circuit 600 is electrically connected to the motor 200 and the encoder 210 on the motor 200. The barrel cover control method includes, but is not limited to the following steps.

S100: The drive circuit 600 obtains an encoding signal output by the encoder 210, and calculates a rotation speed and a rotation angle of the motor 200.

S200: The drive circuit 600 outputs a drive electric signal to the motor 200 according to the rotation speed and the rotation angle.

S300: The motor 200 drives the cover plate 500 to rotate in response to the drive electric signal and through the buffer 300 and the driving shaft 400.

For the barrel cover with an encoder that performs the barrel cover control method of the present disclosure, the drive circuit 600 thereof can obtain the rotation speed and rotation angle of the motor 200 through the encoder 210 and control the operation state of the motor 200 according to the rotation speed and rotation angle of the motor 200, so that the motor 200 can stably drive the cover plate 500 to rotate. The barrel cover control method of the present disclosure can both prevent severe shaking of the garbage bin caused by an overquick speed or instability of cover opening for the cover plate 500, and can also prevent gas in the garbage bin from being fanned into an external environment outside the garbage bin due to an overquick speed or instability of cover closing for the cover plate 500; in addition, it can make the cover plate 500 and the housing fit tightly, and under the condition that the garbage bin is placed in an inclined manner, the garbage is prevented from being leaked from a gap between the cover plate 500 and the housing, thereby effectively improving the user experience and ensuring the user health.

Figure 9:
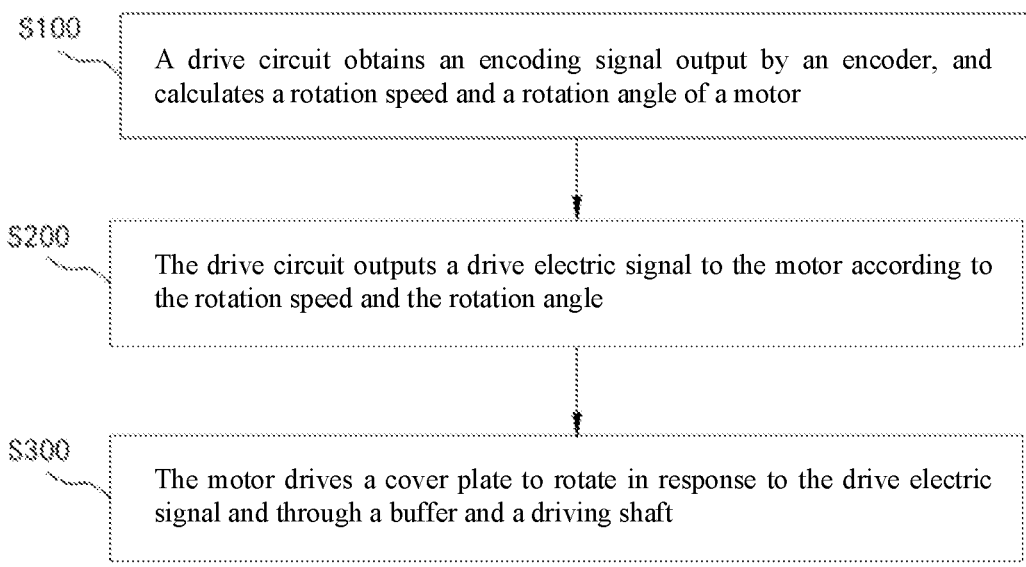
FIG. 9 is a schematic diagram of a barrel cover control method according to an embodiment of the present disclosure.
Figure 10:
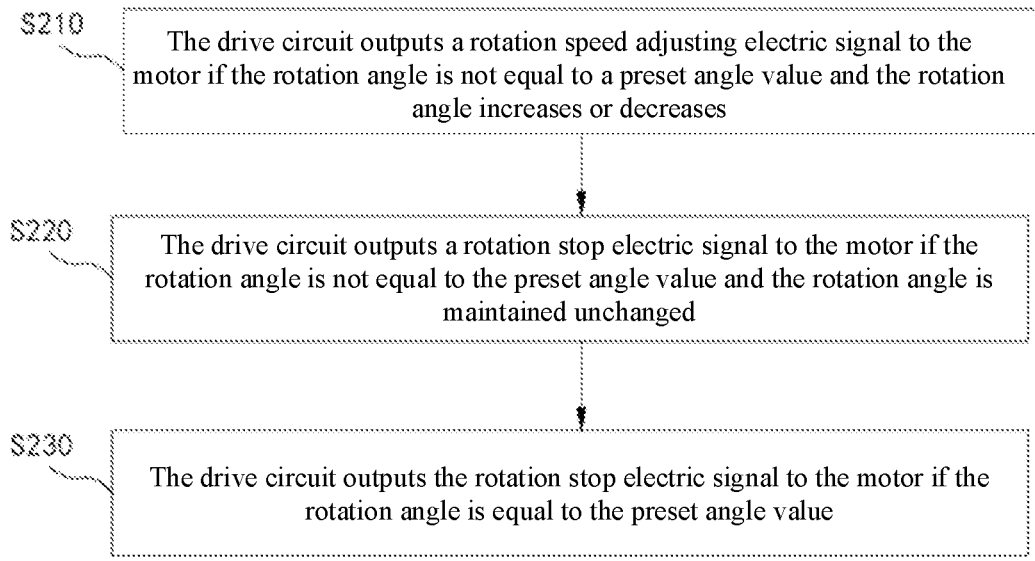
FIG. 10 is a schematic diagram of a barrel cover control method according to another embodiment of the present disclosure.

Referring to FIG. 1, FIG. 2, FIG. 3, and FIG. 10, for the barrel cover control method provided by another embodiment of the present disclosure, based on the embodiments above, the method shown in FIG. 10 is a specific process of step S200 in FIG. 9, and the method includes but is not limited to the following steps.

S210: The drive circuit 600 outputs a rotation speed adjusting electric signal to the motor 200 if the rotation angle is not equal to a preset angle value and the rotation angle increases or decreases.

S220: The drive circuit 600 outputs a rotation stop electric signal to the motor 200 if the rotation angle is not equal to the preset angle value and the rotation angle is maintained unchanged.

S230: The drive circuit 600 outputs the rotation stop electric signal to the motor 200 if the rotation angle is equal to the preset angle value.

Through the barrel cover control method of this embodiment, the drive circuit 600 sends a corresponding control electric signal to the motor 200 according to the current rotation angle of the motor 200: when the cover plate 500 is in a cover opening or closing process, i.e., the motor 200 has not reached a preset cover opening preset angle value or a preset cover closing preset angle value, if the rotation angle of the motor 200 is in an increasing or decreasing state, the drive circuit 600 outputs to the motor 200 the rotation speed adjusting electric signal for maintaining the rotation speed of the motor 200, so as to enable the cover plate 500 to stably rotate; if the rotation angle of the motor 200 does not change, i.e., an external force on the cover plate 500, the buffer 300, or the driving shaft 400, or other factors make the rotary shaft of the motor 200 unable to rotate, the drive circuit 600 outputs the rotation stop electric signal to the motor 200, so that the rotary shaft of the motor 200 is locked and rotation is stopped, thereby preventing the motor 200, the buffer 300, the driving shaft 400, and the cover plate 500 from being damaged by a torsion force of the motor 200. When the cover plate 500 reaches the preset cover opening angle value or the preset cover closing angle value, i.e., the cover plate 500 is already completely opened or tightly fits the face housing 100, the drive circuit 600 outputs the rotation stop electric signal to the motor 200, so that the rotary shaft of the motor 200 is locked and the rotation is stopped, thereby preventing the cover plate 500 from rotating toward the direction of the face housing 100 to pinch a hand of the user under the function of other external forces such as wind power when the user puts garbage into the garbage bin; meanwhile, it may further prevent the garbage from leaking from the gap between the cover plate 500 and the face housing 100 due to the inclined garbage bin when the cover plate 500 is closed, thereby effectively improving the user experience.

Figure 11:
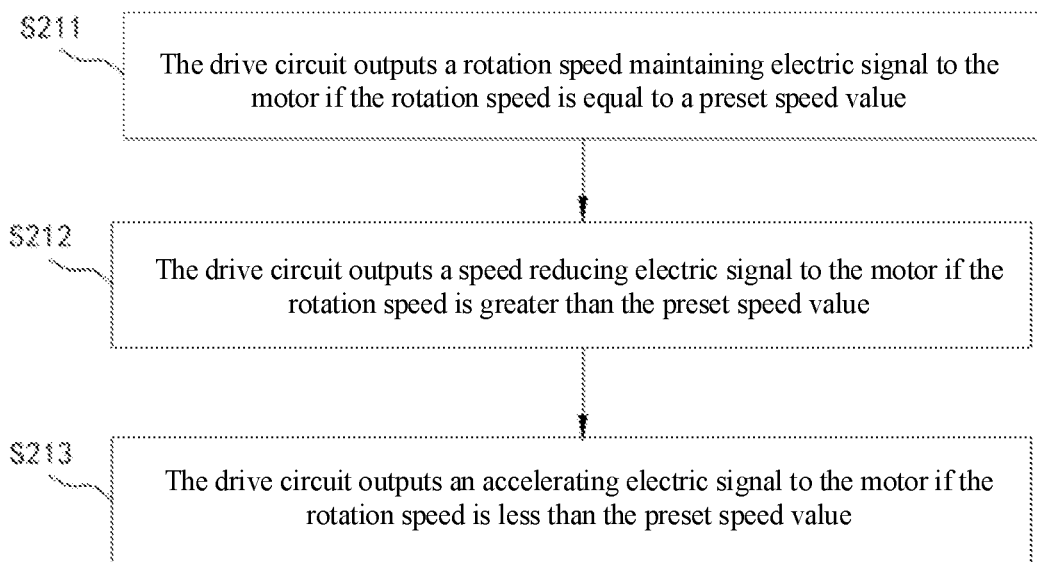
FIG. 11 is a schematic diagram of a barrel cover control method according to another embodiment of the present disclosure.

Referring to FIG. 1, FIG. 2, FIG. 3, and FIG. 11, for the barrel cover control method provided by another embodiment of the present disclosure, based on the embodiments above, the method shown in FIG. 11 is a specific flow of step S210 in FIG. 10, and the method includes but is not limited to the following steps.

S211: The drive circuit 600 outputs a rotation speed maintaining electric signal to the motor 200 if the rotation speed is equal to a preset speed value.

S212: The drive circuit 600 outputs a speed reducing electric signal to the motor 200 if the rotation speed is greater than the preset speed value.

S213: The drive circuit 600 outputs an accelerating electric signal to the motor 200 if the rotation speed is less than the preset speed value.

Through the barrel cover control method of this embodiment, the drive circuit 600 adjusts the rotation speed of the motor 200 according to the current rotation speed of the motor 200; when the cover plate 500 is in a cover opening or closing process, the drive circuit 600 monitors the rotation speed of the motor 200: if the rotation speed is equal to a preset speed value, the drive circuit 600 outputs the rotation speed maintaining electric signal for maintaining the current rotation speed to the motor 200; if the rotation speed is greater than the preset speed value, the drive circuit 600 outputs the speed reducing electric signal for reducing the rotation speed of the motor 200 to the motor 200; if the rotation speed is less than the preset speed value, the drive circuit 600 outputs the accelerating electric signal to the motor 200 for improving the rotation speed of the motor 200, so that the cover plate 500 can stably rotate during the cover opening and closing process, which can both prevent severe shaking of the garbage bin caused by an overquick speed or instability of cover opening for the cover plate 500, and can also prevent gas in the garbage bin from being fanned into an external environment outside the garbage bin due to an overquick speed or instability of cover closing for the cover plate 500, thereby effectively improving the user experience and ensuring the user health.

It should be further explained that the motor 200 can be a brush motor and can also be a brushless motor; accordingly, the drive electric signal output by the drive circuit 600 to the motor 200 can be a direct-current signal and can also be an alternating-current signal. When the drive electric signal is the direct-current signal, the rotation speed maintaining electric signal, the speed reducing electric signal, and the accelerating electric signal can be obtained by changing the voltage value of the drive electric signal; the rotation stop electric signal may a direct-current signal with the voltage value to be zero; when the drive electric signal is the alternating-current signal, the rotation speed maintaining electric signal, the speed reducing electric signal, and the accelerating electric signal can be obtained by changing a frequency value of the drive electric signal; the rotation stop electric signal can be the alternating-current signal with the frequency value to be zero.

Referring to FIG. 1, FIG. 2, FIG. 3, FIG. 6, and FIG. 12, a barrel cover control method provided by another embodiment of the present disclosure is applied to a barrel cover with an encoder; the barrel cover with an encoder includes a housing, a motor 200, a buffer 300, a driving shaft 400, a cover plate 500, a drive circuit 600, and a current detection module 610. The housing includes a face housing 100 and a bottom housing 700; the face housing 100 is provided at the middle with the cover opening 110 for putting garbage; the first connecting base 130 and the second connecting base 140 are disposed at a face of the face housing 100 adjacent to the bottom housing 700; the bottom housing 700 is connected to the face housing 100 to form an accommodating cavity; and the motor 200, the buffer 300, the driving shaft 400, the drive circuit 600, and the current detection module 610 are disposed in the accommodating cavity. The motor 200 is connected to a face of the face housing 100 adjacent to the bottom housing 700; and the motor 200 is provided with an encoder 210. A first end of the buffer 300 is rotatably connected to the first connecting base 130; a rotary shaft of the motor 200 is connected to the first end of the buffer 300; and the buffer 300 rotates under the drive of the motor 200. An end of the driving shaft 400 is rotatably connected to the second connecting base 140; the other end of the driving shaft 400 is connected to a second end of the buffer 300; the driving shaft 400 rotates around its own axial direction under the function of the buffer 300. The cover plate 500 is connected to the driving shaft 400; the cover plate 500 rotates with the rotation of the driving shaft 400; when the cover plate 500 moves toward the direction of the cover opening 110 and fits with the face housing 100, the cover plate 500 covers the cover opening 110; and when the cover plate 500 moves toward a direction away from the cover opening 110, the cover opening 110 is opened. The drive circuit 600 is electrically connected to the motor 200 and the encoder 210 on the motor 200. The current detection module 610 is connected in series between the motor 200 and the drive circuit 600; the current detection module 610 is in signal connection with the drive circuit 600. The barrel cover control method includes, but is not limited to the following steps.

S410: The drive circuit 600 obtains an encoding signal output by the encoder 210, and calculates a rotation speed and a rotation angle of the motor 200.

S420: The drive circuit 600 obtains a current signal output by the current detection module 610 and calculates a working current of the motor 200; and the drive circuit 600 outputs a drive electric signal to the motor 200 according to the rotation speed and the rotation angle if the working current is small than or equal to the current threshold.

S430: The motor 200 drives the cover plate 500 to rotate in response to the drive electric signal and through the buffer 300 and the driving shaft 400.

S440: The drive circuit 600 obtains a current signal output by the current detection module 610 and calculates a working current of the motor 200; and the drive circuit 600 outputs a rotation stop electric signal to the motor 200 if the working current is greater than a current threshold.

For the barrel cover with an encoder that performs the barrel cover control method of the present disclosure, the current detection module 610 is connected in series between the motor 200 and the drive circuit 600, and therefore, a value of a current passing through the current detection module 610 is equal to the working current of the motor 200. The current detection module 610 is in signal connection with a signal of the drive circuit 600 to output to the drive circuit 600 a current signal including the working current information of the motor 200; and the drive circuit 600 calculates the working current of the motor 200 through the current signal. When the working current of the motor 200 is greater than a preset current threshold, the drive circuit 600 enables the motor 200 to stop rotation to prevent the motor 200 from being burned down; when the working current of the motor 200 is less than or equal to the present current threshold and the cover plate 500 has not reached the reset angle value, the drive circuit 600 drives the rotary shaft of the motor 200 to rotate. The drive circuit 600 thereof can obtain the rotation speed and rotation angle of the motor 200 through the encoder 210 and control the operation state of the motor 200 according to the rotation speed and rotation angle of the motor 200, so that the motor 200 can stably drive the cover plate 500 to rotate. The barrel cover control method of the present disclosure can both prevent severe shaking of the garbage bin caused by an overquick speed or instability of cover opening for the cover plate 500, and can also prevent gas in the garbage bin from being fanned into an external environment outside the garbage bin caused by an overquick speed or instability of cover closing for the cover plate 500; in addition, it can make the cover plate 500 and the housing fit tightly, and under the condition that the garbage bin is placed in an inclined manner, the garbage is prevented from being leaked from a gap between the cover plate 500 and the housing, which effectively improves the user experience and ensures the user health. An embodiment of the present disclosure provides a motor driver, including at least a process configured to be in communication connection to the encoder 210 and the current detection module 610 and at least one memory configured to be in communication connection to the processor; in this embodiment, the number of the processor is one, the number of the memory is one, and the encoder 210, and the current detection module 610 are in communication connection to the processor. The memory stores instructions; the instructions are executed by the processor, which enables the processor to execute the barrel cover control method in the embodiment above, for example, executing the method steps S100, S200, and S300 in FIG. 9 described above, executing the method steps S210, S220, and S230 in FIG. 10, executing the method steps S211, S212, and S213 in FIG. 11, and executing the method steps S410, S420, S430, and S440 in FIG. 12.

Figure 12:
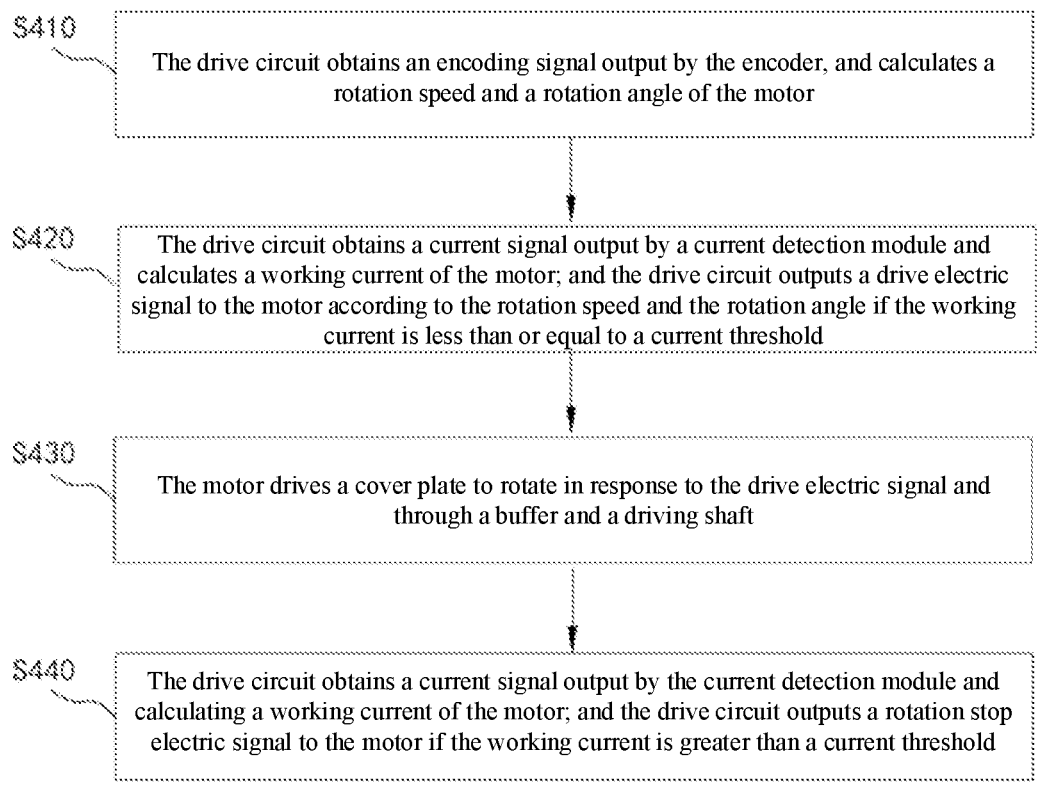
FIG. 12 is a schematic diagram of a barrel cover control method according to another embodiment of the present disclosure.

An embodiment of the present disclosure provides a non-transitory computer-readable storage medium, where the non-transitory computer-readable storage medium stores computer-executable instructions which, when executed by a computer, cause the computer to perform the barrel cover control method in the embodiment above, for example, executing the method steps S100, S200, and S300 in FIG. 9 described above, executing the method steps S210, S220, and S230 in FIG. 10, executing the method steps S211, S212, and S213 in FIG. 11, and executing the method steps S410, S420, S430, and S440 in FIG. 12.

A person of ordinary skill can understand that all or some steps in the method and systems described in the preceding text can be implemented as software, firmware, hardware, and a proper combination thereof. Certain physical components or all physical components can be implemented as software executed by a processor, for example, a central processing unit, a digital signal processor, or a microprocessor, or implemented as hardware, or implemented as an integrated circuit, such as a application-specific integrated circuit. Such software may be distributed on a storage medium; and the storage medium may include a computer storage medium (or a non-transitory medium) and a communication medium (or a transitory medium). As well known to a person of ordinary skill in the art, the term, storage medium, includes volatile and non-volatile, removable and non-removable media implemented in any method or technology for storing information (for example, a computer-readable instruction, a data structure, a program module, or other data). The storage medium includes, but is not limited to, an RAM, an ROM, an EEPROM, a flash memory or other memory technologies, a CD-ROM, a digital versatile disc (DVD) or other optical disk storage, a cartridge, a magnetic tape, a disk storage or other magnetic storage apparatus, or any other medium that can be used for storing desired information and can be accessed by a computer. In addition, it is well known to a person of ordinary skill in the art that the communication medium generally includes computer-readable instructions, a data structure, a program module, or other data in a modulating data signal such as a carrier or other transmission mechanism, and may include any information delivery medium.

The embodiments of the present disclosure are explained in detail by combining the accompanying drawings above; however, the present disclosure is not limited to the embodiments above; within the range of knowledge mastered by a person of ordinary skill in the art, various changes may be made without departing from purposes of the present disclosure.

What is claimed is:

1. A barrel cover with an encoder, comprising:
a housing provided with a cover opening, a first connecting base, and a second connecting base;
a motor provided with an encoder and connected to the housing;
a buffer, the first connecting base being rotatably connected to a first end of the buffer, and a rotary shaft of the motor being connected to the first end of the buffer;
a driving shaft, an end of the driving shaft being rotatably connected to the second connecting base, and the other end of the driving shaft being connected to a second end of the buffer;
a cover plate connected to the driving shaft and configured to cover the cover opening; and
a drive circuit electrically connected to the motor and the encoder:
wherein the housing comprises a face housing and a bottom housing, the face housing is provided with the cover opening, the first connecting base, and the second connecting base, the face housing is connected to the bottom housing to form an accommodating cavity, and the first connecting base, the second connecting base, the motor, the buffer, the driving shaft, and the drive circuit are disposed in the accommodating cavity;
wherein the housing comprises a face housing and a bottom housing, the face housing is provided with the cover opening, the first connecting base, and the second connecting base, the face housing is connected to the bottom housing to form an accommodating cavity, and the first connecting base, the second connecting base, the motor, the buffer, the driving shaft, and the drive circuit are disposed in the accommodating cavity.

2. The barrel cover of claim 1, wherein a face of the face housing adjacent to the first connecting base is provided with a second inner stud, the first connecting base is provided with a second screw hole, the first connecting base is connected to the face housing through the second inner stud and the second screw hole, a face of the face housing adjacent to the second connecting base is provided with a third inner stud, the second connecting base is provided with a third screw hole, the second connecting base is connected to the face housing through the third inner stud and the third screw hole and forms a second through hole, and the driving shaft penetrates through the second through hole.

3. The barrel cover of claim 1, wherein the buffer comprises a connecting head, a first connecting arm, and a second connecting arm, the connecting head is provided with a third through hole, a sidewall of the connecting head is provided with a connecting plate, the driving shaft penetrates through the third through hole, the connecting plate is in transmissive connection to an end of the first connecting arm, the other end of the first connecting arm is in transmissive connection to an end of the second connecting arm, the other end of the second connecting arm is provided with a connecting post, the first connecting base is provided with a connecting hole, the connecting post is rotatably connected to the connecting hole, and the rotary shaft of the motor is coaxially disposed with the connecting post.

4. The barrel cover of claim 3, wherein an end of the driving shaft adjacent to the first connecting base is provided with a first torsion spring, the first torsion spring is disposed around the circumference of the driving shaft, an end of the first torsion spring abuts against the face housing, the other end of the first torsion spring is connected to the connecting head, an end of the driving shaft adjacent to the second connecting base is provided with a second torsion spring and a driving plate, the driving plate is connected to a sidewall of the driving shaft, the second torsion spring is disposed around the circumference of the driving shaft, an end of the second torsion spring abuts against the face housing, and the other end of the second torsion spring is connected to the driving plate.

5. The barrel cover of claim 3, wherein the connecting post is provided with a third torsion spring, the third torsion spring is disposed around the circumference of the connecting post, a plurality of clamping slots are disposed on the first connecting base, an end of the third torsion spring abuts against the clamping slots, and the other end of the third torsion spring is connected to the second connecting arm.

6. The barrel cover of claim 2, wherein the encoder is a magnetic ring encoder or a grating encoder.

7. The barrel cover of claim 1, further comprising a current detection module electrically connected to the motor and the drive circuit.

* * * * *